Sept. 7, 1943.  E. B. LEAR  2,328,816
PLATE FASTENING DEVICE
Filed Aug. 12, 1941
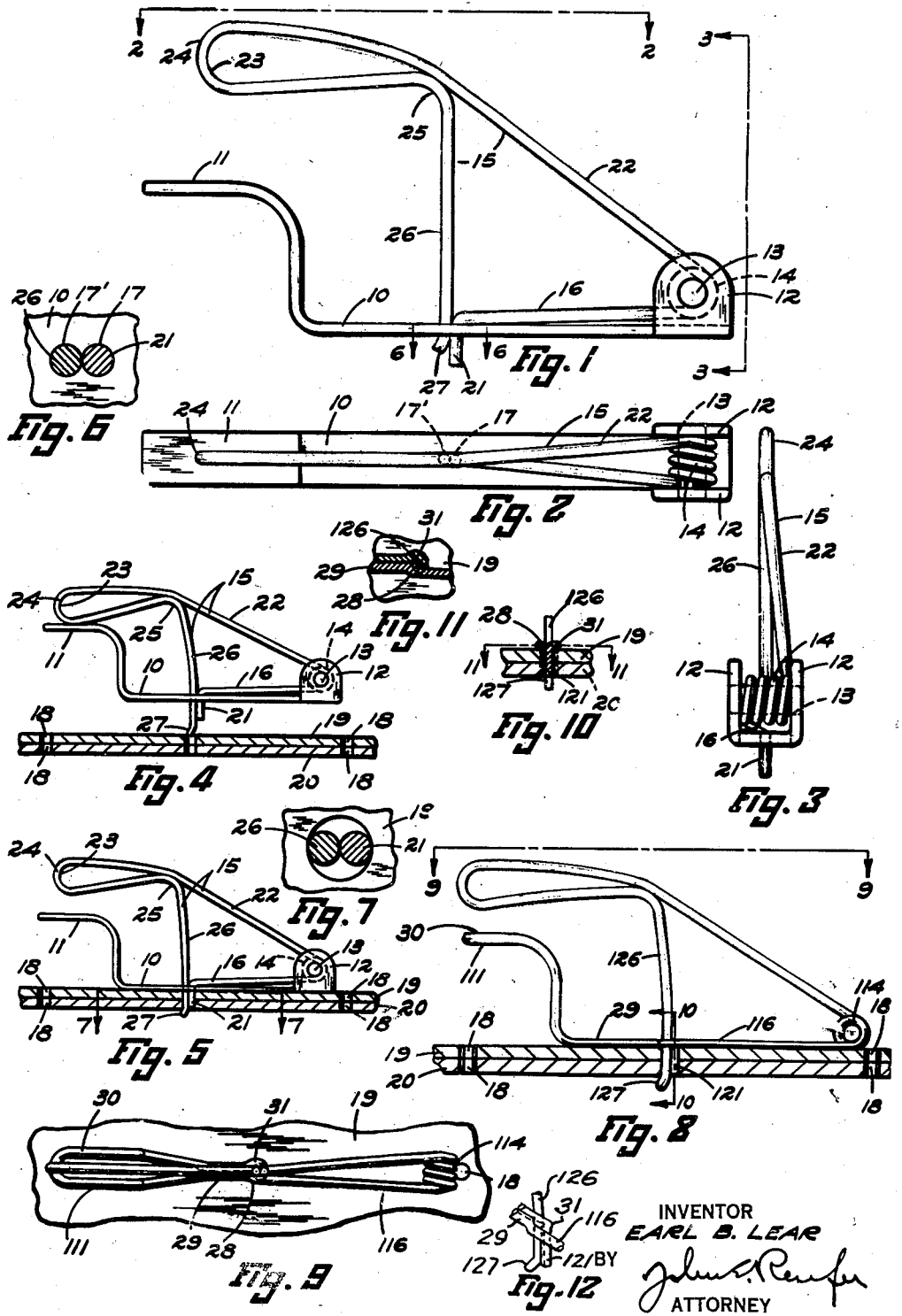
INVENTOR
EARL B. LEAR
BY
ATTORNEY Patented Sept. 7, 1943

2,328,816

UNITED STATES PATENT OFFICE 2,328,816

PLATE FASTENING DEVICE

Earl B. Lear, Garfield Heights, Ohio, assignor to The Cleveland Pneumatic Tool Company, Cleveland, Ohio, a corporation of Ohio Application August 12, 1941, Serial No. 406,561

6 Claims. (Cl. 85—5)

This invention relates to a plate fastener for temporarily holding together perforated plates or sheets preparatory to the riveting thereof.

One object of this invention is to produce an improved plate fastener which can be easily applied to and removed from the work without the use of auxiliary equipment.

Another object of this invention is to produce a device capable of securing plates together in such a manner that the holes therein will be coaxially aligned.

Another object of this invention is to produce a plate fastening device which is simple of construction, and sturdy, durable and efficient in operation.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view of the improved fastener in its normal position before application to the work.

Fig. 2 is a top elevational view looking in the direction of arrows 2—2 in Fig. 1.

Fig. 3 is an end elevational view looking in the direction of the arrows 3—3 in Fig. 1.

Fig. 4 is a side elevational view of the fastener in the position it assumes just before its insertion into the work.

Fig. 5 is a view similar to Fig. 4 but illustrating the fastener in operative position.

Fig. 6 is an enlarged cross-sectional view taken in a plane indicated by line 6—6 in Fig. 1.

Fig. 7 is an enlarged cross-sectional view taken in a plane indicated by line 7—7 in Fig. 5.

Fig. 8 is a side elevational view of a modified fastener shown in operative position.

Fig. 9 is a top elevational view of the modified fastener looking in the direction of the arrows 9—9 in Fig. 8.

Fig. 10 is a cross sectional view taken in a plane indicated by line 10—10 in Fig. 8.

Fig. 11 is a cross sectional view taken in a plane indicated by line 11—11 in Fig. 10.

Fig. 12 is a perspective view of the portion of the fastener shown in Fig. 11.

Referring to the drawing in which like symbols designate corresponding parts throughout the several views, 10 represents a base preferably made of a relatively narrow and thin metal strip adapted to rest on the work in a manner hereinafter described. Toward its left end in Fig. 1, the base 10 is formed with a double right angle bend to provide a handle 11 sufficiently spaced from the base 10 for accommodating the hand or fingers of the operator as will be explained later. The right end of the base of Figs. 1 and 2 is provided with two laterally spaced upwardly extending lugs 12 carrying a pin 13 which extends therebetween and is rigidly fastened thereto in any suitable manner.

Wound around the pin 13 to form a torsional spring 14, there is a portion of a wire generally designated by 15, which wire is preferably made of spring wire and has a branch 16 extending from the spring 14 above the base 10. Intermediate its ends, the base 10 is provided with two tangent holes 17 and 17' each of a diameter equal to one-half that of perforations 18 provided through the work shown in Figs. 4 and 5 by two superposed sheets 19 and 20. The diameter of the wire 15 is equal to the diameter of the holes 17 and 17'. The branch 16 has its free end bent at a substantially right angle and extends through the base hole 17 to form a tail piece 21 protruding below the base a distance calculated to be about equal to the combined thickness of the sheets 19 and 20. From the spring 14, there is another branch 22 extending therefrom at about 45° toward the left in Fig. 1, where it is bent upon itself as at 23 above the handle 11 to form a second handle 24. From the bend 23 the branch 22 extends substantially horizontally toward the right in Fig. 1 and above the base hole 17' is bent at right angle as at 25 to form a straight vertical end portion, hereinafter referred to as rod 26, which extends through the hole 17'. Below the base 10 the end of the rod 26 is bent outwardly to form a lateral projection or hook 27 normally engaging the lower side of the base 10 and preventing upward movement of the rod 26 relative to the base by the tension of the spring 14. In practice, the distance between the handles 11 and 24 is such that upon movement of the handle 24 toward the handle 11, the rod 26 will extend through the base 10 a distance sufficient for its insertion through the sheets 19 and 20 prior to a similar insertion of the tail piece 21.

The operation of the device is as follows:

When it is desired to hold the perforated sheets 19 and 20 together, the perforations 18 thereof are first aligned sufficiently to enable insertion of the rod's lower portion 26 through two perforations in a manner illustrated in Fig. 4. In this instance, the operator will hold the handles 11 and 24 by positioning the first finger under the handle 11 and the thumb over the handle 24. By exerting a squeezing action, the handle 24 will be moved to the handle 11, as shown in Fig. 4 against the tension of the spring 14, thereby causing the rod 26 to project partly below the base 10 for insertion through aligned perforations 18 of the work. Subsequently, and while the fastener is still depressed or in the position shown in Fig. 4, the tail piece 21 is also inserted in the perforations 18 until the base 10 rests on the work or more particularly on the upper plate 19, as shown in Fig. 5. Thereafter the operator may release the handles 11 and 24 and the tension spring 14 will cause through the branch 22 upward movement of the rod 26 resulting in the engagement of the lateral projection or hook 27 with the underside of the lower sheet 20. The tension of the spring 14 is sufficient to firmly clamp between the base 10 and the hook 27, the sheets 19 and 20. Since the diameter of the wire 15 is one-half the diameter of the hole 17 and perforations 18, it will be understood that the tail piece 21 and rod 26 will engage the inner wall of the perforation as shown in Fig. 7 for maintaining the perforation in perfect alignment and permit the perforations not used by the fastener to receive rivets which may be upset while the sheets are held firmly together by the fastener in the manner above described.

The two tangent holes 17 and 17' through the plate or base 10 act as a guide for the tail piece 21 and rod 26, thereby preventing their lateral movement relative to the base which would be possible if the hole through the base was of a diameter equal to that of the perforations 18.

After the riveting operation, the fastener may be removed from the work by again squeezing the handles 11 and 24 toward each other as shown in Fig. 4 and simply removing the rod 26 from the perforation 17 by slightly tilting the fastener.

In the modification shown in Figs. 8 to 12 inclusive, the rigid base 10 has been replaced by a base made of a continuation of the branch 116, which branch instead of being bent directly into the hole 17 passes the rod 126 where it is partly wound around the rod as at 28, Fig. 11, and extends therefrom horizontally as at 29. Toward the left in Fig. 8, the branch 116 is also formed with a double right angle bend to provide a handle 111. At the end of the handle, the wire is bent upon itself as at 30, Fig. 9, and comes back with the same double bend above referred to to the rod 126 in the same horizontal plane as the branch 116. Finally it is partly wound around the rod 126 as at 31, Fig. 12, and subsequently bent downwardly at right angle to form a tail piece 121 which is the equivalent of the tail piece 21 in Fig. 1. The rod 126 is of course also provided with a hook 127 protruding below the branch 116, the rod being slidable between the two semi-circles 28 and 31, in Fig. 11.

Obviously the operation of the modified fastener is the same as that above described with the fastener shown in Figs. 1 to 7 inclusive except that instead of the work being clamped between the base 10 and the hook 27, it is clamped between the branch 116 and the hook 127 as shown in Fig. 8.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A fastener for temporarily holding together at least two perforated sheets in superposed position, including a base, a handle for said base, a tail piece depending from said base for insertion into aligned perforations of said sheets, a rod slidable through said base alongside of said tail piece, a lateral projection on said rod below said base insertable through said perforations ahead of said tail piece upon downward slidable movement of said rod relative to said base, a handle for said rod movable toward said base-handle for effecting the slidable downward movement of said rod and a spring carried by said base active on said rod for clamping said sheets between said base and the lateral projection on said rod.

2. A fastener for temporarily holding together at least two perforated sheets in superposed position, including a base adapted to rest on the upper sheet, a handle for said base, a tail piece depending from said base for insertion into aligned perforations of said sheets, a rod slidable through said base alongside of said tail piece, a lateral projection on said rod below said base insertable through said perforations ahead of said tail piece upon downward slidable movement of the rod relative to the base, a spring active on said rod for clamping said sheets between said base and the lateral projection on said rod, and a handle for said rod movable toward the base-handle for effecting the slidable downward movement of said rod, said tail piece, rod and rod-handle being made of a single wire bent into the appropriate shape.

3. A fastener for temporarily holding together at least two perforated sheets in superposed position, including a base adapted to rest on the upper sheet, a handle for said base, said base having a vertical opening therein, a tail piece in said opening protruding below said base, said tail piece being formed of a spring wire bent horizontally above said base and thereafter wound to form a torsion spring, from said spring said wire extending above said handle to form a second handle vertically spaced from the first one, from said second handle said wire extending to a point vertically above said opening where it is bent to form a rod slidable through said opening, a lateral projection on the free end of said rod below said base insertable through aligned perforations of said sheets ahead of said tail piece upon movement of said handles toward each other, said projection being engageable with the under side of the lower sheet for clamping the sheets between said projection and base by virtue of the action of said spring.

4. A fastener for temporarily holding together at least two perforated sheets in superposed position, including a substantially flat elongated base adapted to rest on the upper sheet, said base having a vertical opening therein, a tail piece in said opening depending from said base for insertion into aligned perforations in said sheets, a rod slidable through said opening alongside of said tail piece, a lateral projection on said rod below said base insertable through said perforations ahead of said tail piece upon downward slidable movement of the rod relative to the base, and tail piece and rod having a circular cross section of a diameter equal to one-half that of said perforations, and a spring carried by said base active on said rod for clamping said sheets between said base and said lateral projection.

5. A fastener for temporarily holding together at least two perforated sheets in superposed position, including a base having a bore therein, a handle for said base, a retaining member slidable through said bore, a lateral projection on said member below said base insertable through aligned perforations of said sheets upon downward slidable movement of said member relative to said base, a handle for said member movable toward said base-handle for effecting the slidable downward movement of said member, and a spring carried by said base active on said member for clamping said sheets between said base and the lateral projection on said member.

6. A fastener for temporarily holding together at least two perforated sheets in superposed position, including a base adapted to rest on the upper sheet, a tail piece depending from said base for insertion into aligned perforations of said sheets, a rod slidable through said base alongside of said tail piece, a lateral projection on said rod below said base insertable through said perforations ahead of said tail piece upon downward slidable movement of the rod relative to the base, a spring active on said rod for clamping said sheets between said base and the lateral projection on said rod, said base, tail piece and rod being formed of a single wire with said base partially wound around one side of said rod and extending forwardly thereof to form a handle portion, and said handle portion extending rearwardly toward said rod and wound around the opposite side thereof before termination in the tail piece.

EARL B. LEAR.